(12) United States Patent
Lane, III

(10) Patent No.: US 8,636,028 B2
(45) Date of Patent: Jan. 28, 2014

(54) REFILLABLE PROPANE CYLINDER AND VALVE ASSEMBLY THEREFORE

(75) Inventor: R. F. Lane, III, Brentwood, TN (US)

(73) Assignee: McWane, Inc., Birmingham, AL (US)

( * ) Notice: Subject to any disclaimer, the term of this patent is extended or adjusted under 35 U.S.C. 154(b) by 519 days.

(21) Appl. No.: 12/605,059

(22) Filed: Oct. 23, 2009

(65) Prior Publication Data

US 2011/0094608 A1  Apr. 28, 2011

(51) Int. Cl.
- F16K 17/10 (2006.01)
- F17D 3/00 (2006.01)
- F16L 37/40 (2006.01)

(52) U.S. Cl.
USPC ...... 137/588; 137/614.19; 137/884; 137/558; 251/149.4; 251/149.6

(58) Field of Classification Search
USPC ............ 137/588, 613, 614.19, 884, 558; 251/149.4, 149.6
See application file for complete search history.

(56) References Cited

U.S. PATENT DOCUMENTS

| | | | |
|---|---|---|---|
| 1,564,965 A * | 12/1925 | Phillips et al. | 285/327 |
| 2,218,318 A * | 10/1940 | Pfauser | 137/614.04 |
| 3,058,719 A | 3/1960 | Beebee | |
| 3,234,745 A * | 2/1966 | Johnson | 62/48.1 |
| 3,356,335 A * | 12/1967 | Koch et al. | 251/214 |
| 3,885,589 A | 5/1975 | Iung | |
| 4,360,038 A | 11/1982 | Trnkwalder | |
| 4,462,417 A | 7/1984 | Trinkwalder | |
| 4,635,480 A | 1/1987 | Hrncir | |
| 5,228,474 A | 7/1993 | Nimberger | |
| 5,330,155 A | 7/1994 | Lechner | |
| 5,549,130 A | 8/1996 | Schuster | |
| 5,553,638 A | 9/1996 | Home | |
| 5,581,986 A | 12/1996 | Calver | |
| 5,582,201 A | 12/1996 | Lee | |
| 5,653,256 A * | 8/1997 | Myers et al. | 137/454.2 |
| 6,250,603 B1 | 6/2001 | Knowles | |
| 6,863,087 B1 * | 3/2005 | Wolfgang et al. | 137/881 |
| 6,895,952 B1 | 5/2005 | Bachelder | |
| 6,908,070 B2 | 6/2005 | Bartos | |
| 7,089,956 B1 * | 8/2006 | Davidson et al. | 137/382 |
| 7,461,828 B2 | 12/2008 | Kidprasert | |
| 2006/0157664 A1 | 7/2006 | Huff et al. | |

* cited by examiner

Primary Examiner — Craig Schneider
Assistant Examiner — Atif Chaudry
(74) Attorney, Agent, or Firm — C. Brandon Browning; Maynard, Cooper & Gale, PC

(57) ABSTRACT

A propane system including a refillable and reusable propane cylinder having a volume configured for containing no more than about one pound of propane and a valve assembly detachably coupled to the cylinder. The valve assembly includes a swivel outlet connector configured for operatively coupling the valve assembly to an appliance, a manually activated flow valve arranged for selectively preventing a flow of propane from the cylinder to the appliance, a relief valve and a fixed liquid level gauge configured for alerting a safe filling level of the propane cylinder during cylinder refilling. A back check valve is contained at least partially within a space defined by the swivel outlet connector for selectively allowing the flow of propane out of the valve assembly to a propane fueled appliance or into the valve assembly from a propane source and into the cylinder.

17 Claims, 3 Drawing Sheets

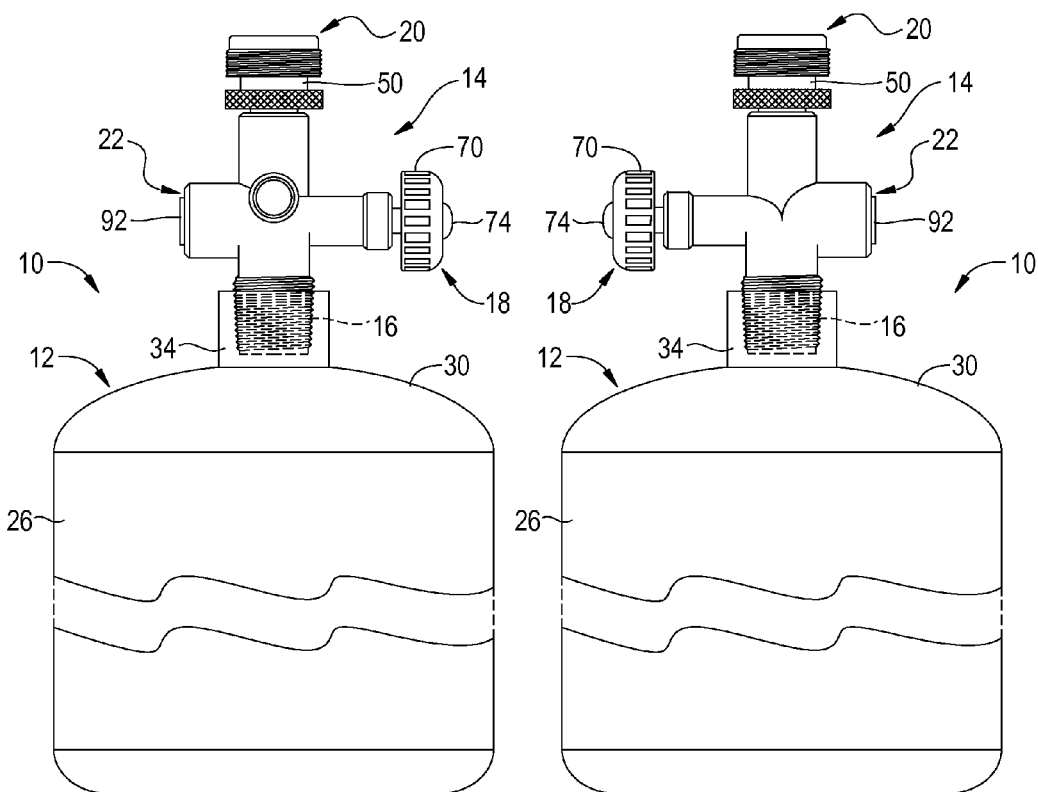
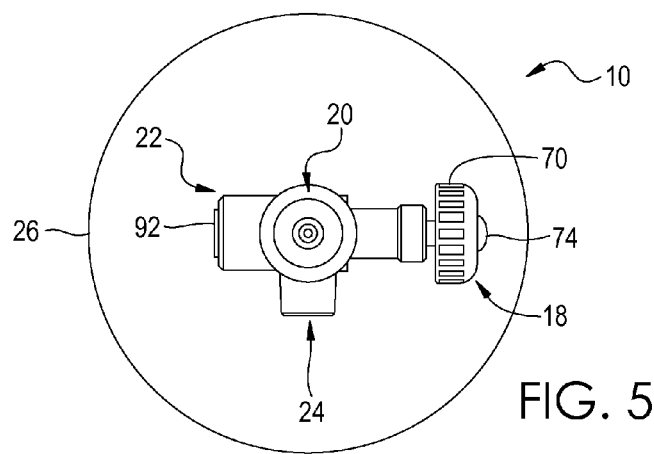

REFILLABLE PROPANE CYLINDER AND VALVE ASSEMBLY THEREFORE

FIELD OF THE INVENTION

The present invention is directed to a propane cylinder and valve assembly therefore, and more particularly to a refillable and reusable one pound propane cylinder and valve assembly combination.

BACKGROUND OF THE INVENTION

One pound propane cylinders are frequently used to fuel appliances such as camping stoves, lanterns, torches and portable water heaters. Current one pound propane cylinders are designed to the DOT 39 Specification which is defined in CFR 49 178.65 as "Specification 39 non-reusable (non-refillable) cylinders." As such, one pound propane cylinders are single use containers and to be destroyed upon completion of use rather than refilled and reused. The valves contained in these cylinders are likewise not to be used to refill the cylinders and are permanently attached to the cylinders with no provision for replacement. That is because the valves have no method for physically preventing the unintentional discharge of propane in the event of a back-check failure. Further, the relief valve of these cylinders is permanently attached to the cylinder with no method of replacement in the event of damage or defect and there is no fixed liquid level gauge on these containers, the use of which is needed to determine the maximum safe filling level of a container.

SUMMARY OF THE INVENTION

The present invention is directed to a refillable and reusable one pound propane cylinder and valve assembly combination. According to one aspect of the invention there is provided a propane system including a refillable propane cylinder having a volume configured for containing no more than about one pound of propane and a valve assembly detachably coupled to the cylinder. The valve assembly includes a swivel outlet connector configured for operatively coupling the valve assembly to an appliance, a manually activated flow valve arranged for selectively preventing a flow of propane from the cylinder to the appliance, a relief valve spaced apart from the cylinder and a fixed liquid level gauge configured for alerting a safe filling level of the propane cylinder during cylinder refilling. A Shrader valve is contained at least partially within a space defined by the swivel outlet connector for selectively allowing the flow of propane out of or into the cylinder.

According to another aspect of the invention, there is provided a method of constructing a refillable propane system. The method includes forming a valve body having an upper portion, a lower portion, a first lateral portion and a second lateral portion. A first passageway is formed through the valve body that exits the valve body through the upper portion, the lower portion and the first and second lateral portions. Thereafter, a swivel outlet connector and Shrader valve assembly are coupled to the upper portion, a manually activated flow valve is coupled to the first lateral portion and a relief valve is coupled to the second lateral portion, all in line with the first passageway. A second passageway is formed through the valve body that exist out of the valve body through a vent formed in a central portion of the valve body and the lower portion. This passageway in combination with a vent tube forms the fixed liquid level gauge. Thereafter, the lower portion of the valve body is operatively coupled to a refillable propane cylinder having a volume configured for containing about one pound of propane or less.

According to yet another aspect of the invention, there is provided a propane cylinder having a volume configured for containing about one pound of propane and a valve body operatively coupled to the propane cylinder. The valve body includes a first connector portion configured for operatively coupling the valve body to a propane fueled appliance, a relief valve portion, a channel fluidly connecting the cylinder volume, the connector portion and the relief valve portion, a flow disruptor configured for selectively fluidly disconnecting the cylinder volume from the first connector portion along the channel, and a vent tube extending into the cylinder volume and out of the valve body through a selectively sealable vent opening. Preferably, the first connector portion is rotatable and includes external threads and a back check valve positioned in the channel that is configured for allowing bi-directional flow of propane through the connector portion. To refill the cylinder, a pressurized propane source is fluidly coupled to the first connector portion and a flow of propane flows from the pressurized propane source, through the channel and into the cylinder. To indicate that the cylinder is filled, a portion of the flow of propane flows through the vent tube and out of the valve body as a gas through the vent opening.

The combination of features described above in one valve assembly eliminates the need for more than one opening in the cylinder and reduces the number of possible appurtenance leaks. Further, the combination allows the entire valve assembly to be replaced in the event of damage or defect without the need to dispose of the entire cylinder.

BRIEF DESCRIPTION OF THE DRAWINGS

FIG. 3 is an elevational view of the cylinder and valve combination depicted in FIG. 1.

FIG. 4 is another elevational view of the cylinder and valve combination depicted in FIG. 1.

FIG. 5 is top plan view of the cylinder and valve combination depicted in FIG. 1.

DETAILED DESCRIPTION OF PRESENTLY PREFERRED EMBODIMENTS

Figure 1:
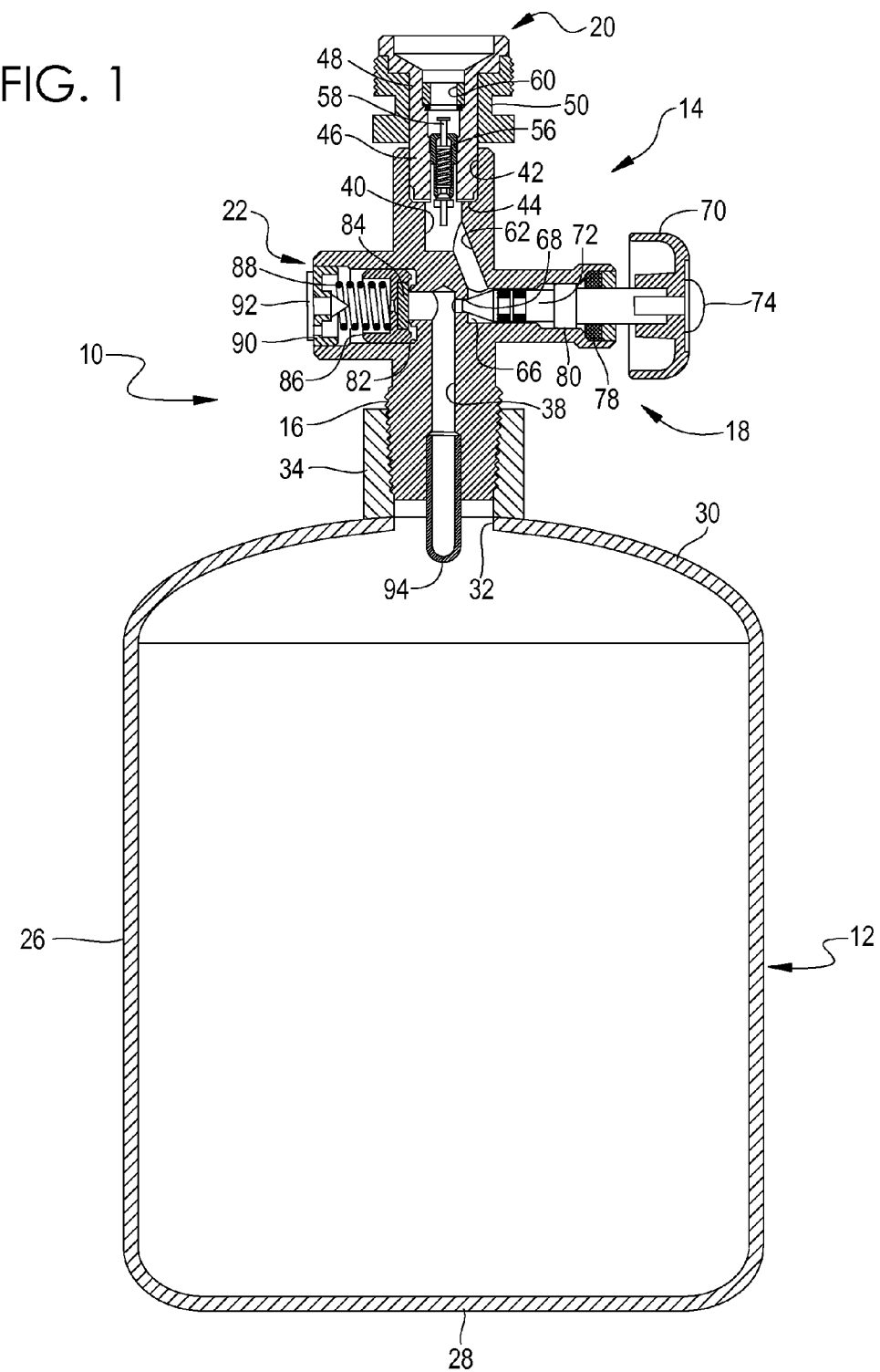
FIG. 1 is sectional view a refillable and reusable one pound propane cylinder and valve assembly combination in accordance with a preferred embodiment of the present invention.
Figure 2:
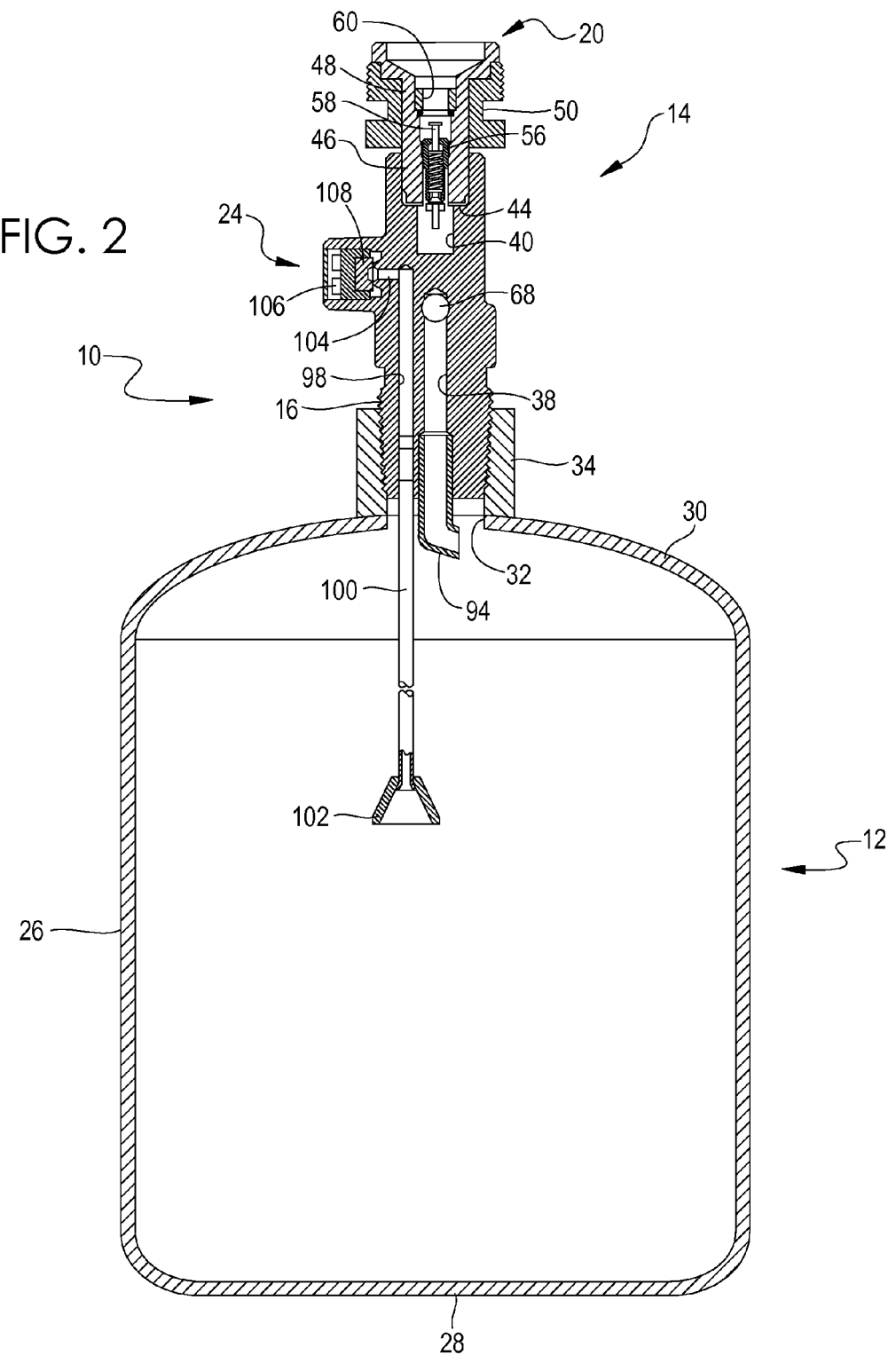
FIG. 2 is another sectional view of the cylinder and valve combination depicted in FIG. 1.

FIGS. 1 through 5 depict a refillable and reusable one pound propane cylinder and valve assembly combination 10 in accordance with a preferred embodiment of the present invention. Cylinder and valve combination 10 generally includes a propane cylinder 12 configured to contain about one pound of propane and an integral valve assembly 14 detachably coupled to cylinder 12. Cylinder 12 has the same or substantially same size and shape as current disposable one pound cylinders so as to fit and function with appliances designed for the disposable one pound cylinder versions. However, cylinder 12 is constructed to the more robust 49 C.F.R. §178.50 4B or 49 C.F.R. §178.51 4BA cylinder specification which is used for refillable containers such as standard twenty pound propane grill cylinders and the like. Valve assembly 14 is provided for attaching cylinder 12 to appliances and safely refilling cylinder 12 as needed. Valve assembly 14 includes a lower threaded portion 16 coupled to cylinder 12 and a hand wheel assembly 18 arranged for turning off and on a flow of propane through valve assembly 14. An outlet connector 20 is provided for coupling the valve assembly to an appliance and a relief valve assembly 22 for relieving cylinder 12 internal pressure. A fixed liquid level gauge 24 alerts a safe filling level of cylinder 12 during cylinder refilling.

More particularly, referring to FIGS. 1-5, cylinder 12 includes a continuous sidewall 26, a substantially flat bottom wall 28, a head portion 30 and a single opening 32. About opening 32 there is provided an internally threaded fitting 34 securely attached to the exterior of head portion 30 by brazing or by welding. The threads of fitting 34 are clean-cut, even, without checks and tapped to gauge. Preferably, the threads of fitting 34 are tapered, and in such event, the length of the threads is not less than that specified for American Standard taper pipe threads. When the threads are straight threads, at least four threads are engaged with four threads of lower portion 16, said threads having a calculated shear strength of at least 10 times the test pressure of cylinder 12. A gasket (not shown) may be used to prevent leakage between lower threaded portion 16 and fitting 34.

Cylinder 12 is manufactured using equipment and processes adequate to ensure that it conforms to the requirements of 49 C.F.R. §178.50 4B and 49 C.F.R. §178.51 4BA. Thus, cylinder 12 is of welded or brazed steel construction and has a reasonably smooth and uniform surface finish. Any seams along head portion 30 or bottom wall 28 of cylinder 12 have a minimum thickness of not less than 90 percent of the required thickness of sidewall 26. All circumferential seams are made by welding or by brazing, and the depth of brazing from the end of cylinder 12 is at least four times the thickness of sidewall 26. All longitudinal seams in the shell of cylinder 12 are made by copper brazing, copper alloy brazing or by silver alloy brazing. Where copper alloy brazing is used, the copper alloy composition is copper 95 percent minimum, silicon 1.5 percent to 3.85 percent and manganese 0.25 percent to 1.10 percent. Where silver alloy brazing is used the melting point of the silver alloy brazing material is in excess of 1,000° F. In each instance, the plate edge is lapped at least eight times the thickness of the plate, the laps being held in position, substantially metal to metal, by riveting or by electric spot-welding. Further, all brazing is done by using a suitable flux and placing brazing material on one side of a seam and applying heat until the material shows uniformly along the seam of the other side.

Cylinder 12 is operatively coupled to valve assembly 14 by screwing valve assembly 14 onto cylinder 12 and engaging lower threaded portion 16 of the valve assembly with fitting 34 of cylinder 12. So arranged, valve assembly 14 is configured to fluidly couple the interior volume of cylinder 12 with a propane run appliance or a source of pressurized propane when cylinder 12 is to be filled. Further, means are provided for indicating when cylinder 12 becomes full during filling operations and relieving pressure within cylinder 12 when necessary or desired.

More particularly, valve assembly 14 comprises a valve body having a primary channel that extends through and between outlet connector 20 along an upper section of the channel and lower threaded portion 16 along a lower section 38 of the channel. The upper section is divided into lower portion 40 having a first diameter and an upper portion 42 having a second diameter that is greater than the first diameter. The transition between lower portion 40 and upper portion 42 forms a seat on which a nylon packing 44 is situated for forming a seal between the seat and outlet connector 20. Outlet connector 20 rests upon the seat and nylon packing 46 and is fixed within upper portion 42 of the upper section of the primary channel by any suitable means known in the art. As illustrated, connector 20 is screwed into upper portion 42, and thus, is readily replaceable. Specifically, outlet connector 20 includes a bottom section 46 that is coupled to and contained within upper portion 42 of the upper section of the primary channel. At least partially contained within bottom section 46 of outlet connector 20 and within the upper section of the primary channel is a Shrader valve or back check valve 56. Back check valve 56 includes a pin 58 which upon compression allows propane to flow in or out of cylinder 12 depending on which side back check valve 56 is more highly pressurized. A replaceable brass retainer ring 60 is used to secure back check valve 56 and an O-ring seal within outlet connector 20.

A middle section 48 of connector 20 extends upward beyond the upper edge of the valve body and is encircled by an externally threaded swivel 50 configured to couple with a propane appliance or pressurized propane source. Specifically, the threads of swivel 50 are configured for connecting outlet connector 20 to appliances meeting the CGA 600 specifications such as conventional soldering torches and camp stoves and lanterns. The connection threads are provided on swivel 50 for reducing stress on valve assembly 14. Thus, cylinder 12 is not rotated into the appliance connection. Rather, cylinder 12 is rigidly held and swivel 50 is rotated to achieve a leak free seal with the appliance.

Referring to FIG. 1, extending at an angle downward from a corner of lower portion 40 of the upper section of the primary channel is a connecting portion 62 of the primary channel which connects the upper section with a middle portion of the primary channel. The middle portion forms a first chamber 66 that partially contains hand wheel assembly 18 which is used to turn on or off the flow of propane through valve assembly 14. In particular, chamber 66 includes a hole 68 that opens directly into a lower section 38 of the primary channel. Hand wheel assembly 18 is configured to selectively block the flow of propane through hole 68 as desired. This is accomplished by providing a hand wheel 70 coupled to an exterior end of a spindle 72 using a set screw 74. Spindle 72 extends into chamber 66 in the direction of hole 68 and terminates in a blunt end arranged to block hole 86. Hand wheel 70 is rotated counter-clockwise and spindle 72 thereby moved away from hole 86 to open propane flow through the primary channel thus allowing propane to flow through valve assembly 14 between cylinder 12 and an appliance. Handwheel is rotated clockwise and thereby moved toward hole 86 to physically and positively stop the flow of propane through the valve assembly 14. To rotatably maintain spindle 72 within chamber 66, spindle 72 is inserted through a gland nut 78 and a stem seat disc 80 located within chamber 66.

Opposite to and aligned with first chamber 66 is a second chamber 82 formed within the valve body. Second chamber 82 is fluidly coupled to the primary channel and provided for housing relief valve assembly 22. Relief valve assembly 22 is of the present invention is more robust and sturdy construction than on current, non-refillable, containers. To that end, relief valve assembly 22 includes a poppet disc 84, a poppet 86, a relief valve spring 88, a safety cap 90 and a safety relief cover 92. Relief valve assembly 22 is pointed in a horizontal direction, and in conjunction with swivel 50, insures that any potential discharge is directed safely away from any sources of ignition.

Lower section 38 of the primary channel extends downwardly from between first chamber 66 and second chamber 82 to open into cylinder 12. A bent or curved ferrule 94 is appended to the bottom of lower threaded portion 16 thus extending the primary channel into cylinder 12. Propane fuel entering into the primary channel enters through an aperture at the end of ferrule 94.

A secondary channel 98 extends parallel to lower section 38 of the primary channel. Secondary channel 98 extends between a vent tube 100 having a deflector 102, both of which extend into cylinder 12, and a vent 104 that exits the valve body through the center portion thereof between the hand wheel assembly and the relief valve assembly. Vent 104 is composed of a vent plug 106 and a vent plug disc 108. Together, the secondary channel 98, vent tube 100 and vent 104 form fixed liquid level gauge 24. Fixed liquid level gauge 24 is opened by opening vent plug 106 during the filling and refilling processes to allow the escape of internal pressure within cylinder 12 caused by the presence of propane vapor. When liquid propane discharges from vent 104, the safe maximum fill level has been reached, and the filling process is terminated.

As will be apparent to one skilled in the art, various modifications can be made within the scope of the aforesaid description. Such modifications being within the ability of one skilled in the art form a part of the present invention and are embraced by the claims below.

It is claimed:

1. A propane system comprising,
    a refillable propane cylinder having a volume configured for containing no more than about one pound of propane, and
    a valve assembly detachably coupled to the cylinder, the valve assembly including,
        an outlet connector configured for operatively coupling the valve assembly to an appliance, the outlet connector including a swivel connector having outwardly facing threads configured for coupling to the appliance and a fixed central bore portion about which the swivel connector and outwardly facing threads are arranged to swivel,
        a manually activated flow valve arranged for selectively preventing a flow of propane from the cylinder to the appliance,
        a bi-directional flow valve disposed within the central bore of the outlet connector and between and in fluid communication with an outlet opening of the outlet connector and the manually activated flow valve, the bi-directional flow valve being configured for allowing a pressurized fluid to selectively flow out of the valve assembly through the outlet connector when the outlet connector is coupled to the appliance and into the valve assembly through the outlet connector when the outlet connector is coupled to a pressurized source of propane,
        a relief valve spaced apart from the cylinder, and
        a fixed liquid level gauge configured for alerting a safe filling level of the propane cylinder during cylinder refilling,
        wherein the manually activated flow valve is substantially aligned with the relief valve and, when the manually activated flow valve is in a closed position, the outlet connector is fluidly disconnected from the refillable propane cylinder by the manually activated flow valve, and
        wherein the valve assembly excludes a refill connector separate from the outlet connector.

2. The system according to claim 1 wherein the bi-directional flow valve is a Schrader valve.

3. The system according to claim 1 wherein the valve assembly includes a threaded body portion detachably coupled to a threaded opening of the cylinder.

4. The system according to claim 3 wherein the threaded body portion is substantially aligned with the outlet connector.

5. A method of constructing a refillable propane system comprising,
    forming a valve body having an upper portion, a lower portion, a first lateral portion and a second lateral portion,
    providing an outlet connector including a swivel connector having outwardly facing threads and a fixed central bore portion about which the swivel connector and outwardly facing threads are arranged to swivel,
    operatively coupling the outlet connector to the upper portion by coupling the fixed central bore portion to the upper portion,
    inserting a bi-directional flow valve within the fixed central bore portion, the bi-directional flow valve being configured for allowing a pressurized fluid to selectively flow out of the valve body through the outlet connector when the outlet connector is coupled to an appliance and into the valve body through the outlet connector when the outlet connector is coupled to a pressurized source of propane,
    operatively coupling a manually activated flow valve to the first lateral portion,
    operatively coupling a relief valve to the second lateral portion, wherein the relief valve is substantially aligned with the manually activated flow valve,
    operatively coupling a fixed liquid level gauge to the lower portion,
    operatively coupling the lower portion to a refillable propane cylinder having a volume configured for containing about one pound of propane or less, and
    configuring the manually activated flow valve to prevent a fluid flow from the outlet connector to the refillable propane cylinder when the manually activated flow valve is in a closed position,
    wherein the valve body excludes a refill connector separate from the outlet connector.

6. The method according to claim 5 including forming a first passageway through the valve body that exits the valve body through the upper portion, the lower portion, and the second lateral portion.

7. The method according to claim 6 including forming a second passageway through the valve body that extends out of the valve body, through the fixed liquid level gauge and into the cylinder volume.

8. The method according to claim 5 including substantially aligning the upper portion with the lower portion and the first lateral portion with the second lateral portion.

9. The method according to claim 5 including detachably coupling the lower portion to the refillable propane cylinder.

10. A propane cylinder having a volume configured for containing about one pound of propane, and a valve body operatively coupled to the propane cylinder, the valve body comprising,
    a first connector portion configured for operatively coupling the valve body to a propane fueled appliance, the first connector portion including a swivel connector portion having outwardly facing threads and a fixed central bore portion about which the swivel connector portion and outwardly facing threads are arranged to swivel,
    a bi-directional flow valve contained within the first connector portion and being stationary relative to the swivel connector portion, the bi-directional flow valve being configured for allowing a pressurized fluid to selectively flow out of the valve body through the first connector portion when the first connector portion is coupled to the propane fueled appliance and into the valve body through the first connector portion when the first connector portion is coupled to a pressurized source of propane, a relief valve portion, a channel fluidly connecting the cylinder volume, the first connector portion and the relief valve portion, a flow disruptor substantially aligned with the relief valve portion configured for selectively fluidly disconnecting the cylinder volume from the first connector portion along the channel, and a vent tube extending into the cylinder volume and out of the valve body through a selectively sealable vent opening, wherein, when the flow disrupter is in a closed position, the first connector portion is fluidly disconnected from the propane cylinder by the flow disrupter, and wherein the valve body excludes a refill connector separate from the first connector portion.

11. The propane cylinder according to claim 10 wherein the bi-directional flow valve is a Schrader valve.

12. The propane cylinder according to claim 10 wherein the flow disruptor includes a manually operated hand wheel coupled to a spindle, the spindle having an end portion configured for selectively obstructing the channel.

13. The propane cylinder according to claim 10 wherein the valve body includes a threaded portion coupled directly to a threaded portion of the cylinder.

14. The propane cylinder according to claim 10 including a pressurized propane source fluidly coupled to the first connector portion and a flow of propane flowing from the pressurized propane source, through the channel and into the cylinder.

15. The propane cylinder according to claim 14 wherein a portion of the flow of propane flows through the vent tube and out of the valve body through the vent opening.

16. The propane cylinder according to claim 10 wherein the cylinder includes a single external opening.

17. A propane cylinder having a volume configured for containing about one pound of propane, and a valve body operatively coupled to the propane cylinder, the valve body comprising, a first connector portion configured for operatively coupling the valve body to a propane fueled appliance, the first connector portion including a swivel connector portion having outwardly facing threads and a fixed central bore portion about which the swivel connector portion and outwardly facing threads are arranged to swivel, a bi-directional flow valve disposed within the first connector portion and being stationary relative to the swivel connector portion, the bi-directional flow valve being configured for allowing a pressurized fluid to selectively flow out of the valve body through the first connector portion when the first connector portion is coupled to the appliance and into the valve body through the first connector portion when the first connector portion is coupled to a pressurized source of propane, a relief valve portion, a channel fluidly connecting the cylinder volume, the first connector portion and the relief valve portion, and a flow disruptor configured for selectively fluidly disconnecting the cylinder volume from the first connector portion along the channel, wherein the flow disrupter is substantially aligned with the relief valve portion and, when the flow disrupter is in a closed position, the first connector is fluidly disconnected from the propane cylinder by the flow disrupter, wherein the valve body excludes a refill connector separate from the first connector portion.

* * * * *